(12) United States Patent
Sawase et al.

(10) Patent No.: US 11,897,254 B2
(45) Date of Patent: Feb. 13, 2024

(54) LIQUID DISCHARGE APPARATUS, PRINTER, AND LIQUID DISCHARGE METHOD

(71) Applicants: Hiroshi Sawase, Kanagawa (JP); Kazuaki Kamihara, Tokyo (JP); Kohki Asada, Tokyo (JP); Ryusaku Hida, Kanagawa (JP); Yoshihiro Takahashi, Tokyo (JP)

(72) Inventors: Hiroshi Sawase, Kanagawa (JP); Kazuaki Kamihara, Tokyo (JP); Kohki Asada, Tokyo (JP); Ryusaku Hida, Kanagawa (JP); Yoshihiro Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/681,844

(22) Filed: Feb. 28, 2022

(65) Prior Publication Data
US 2022/0281241 A1 Sep. 8, 2022

(30) Foreign Application Priority Data
Mar. 2, 2021 (JP) ................. 2021-032240

(51) Int. Cl.
*B41J 11/00* (2006.01)
*B41J 2/525* (2006.01)

(52) U.S. Cl.
CPC ......... *B41J 11/00214* (2021.01); *B41J 2/525* (2013.01); *B41J 11/00218* (2021.01)

(58) Field of Classification Search
CPC .... B41J 11/00214; B41J 11/0021; B41J 2/01; B41J 2/2117; B41J 2/2114; C09D 11/10; C09D 11/30; C09D 11/40; C09D 11/322; C09D 11/101; C09D 4/00; B41M 7/0045; C08G 18/44; B05D 3/06
See application file for complete search history.

(56) References Cited

U.S. PATENT DOCUMENTS 5,635,544 A * 6/1997 Tamura .................... C09D 4/00
522/64
6,306,502 B1 * 10/2001 Fukushima .............. C09D 4/00
522/28
(Continued)

FOREIGN PATENT DOCUMENTS

EP  3 444 119 A1  2/2019
EP  3 666 833 A1  6/2020
(Continued)

OTHER PUBLICATIONS

Extended European Search Report dated Jul. 29, 2022, in corresponding European Application No. 22158292.7.

*Primary Examiner* — John Zimmermann
(74) *Attorney, Agent, or Firm* — XSENSUS LLP

(57) ABSTRACT

A liquid discharge apparatus includes a first liquid that generates heat in an absorption wavelength region of an active energy ray, a first discharger configured to discharge the first liquid, a second liquid that starts polymerization in the absorption wavelength region of the active energy ray, a second discharger configured to discharge the second liquid, and an irradiator configured to irradiate the first liquid and the second liquid with the active energy ray.

11 Claims, 3 Drawing Sheets

(56) References Cited

U.S. PATENT DOCUMENTS

| | | | |
|---|---|---|---|
| 9,221,983 B2* | 12/2015 | Takano | C09D 5/1618 |
| 11,339,306 B2* | 5/2022 | Mano | C09D 133/062 |
| 2013/0033536 A1 | 2/2013 | Sawase | |
| 2013/0065027 A1* | 3/2013 | Mochizuki | C09D 11/40 |
| | | | 347/100 |
| 2013/0222460 A1 | 8/2013 | Sawase | |
| 2015/0306878 A1 | 10/2015 | Sawase | |
| 2016/0101629 A1 | 4/2016 | Sawase | |
| 2016/0129693 A1 | 5/2016 | Moriwaki et al. | |
| 2017/0021641 A1* | 1/2017 | Goi | C09D 11/107 |
| 2017/0080720 A1 | 3/2017 | Mezaki | |
| 2018/0079232 A1* | 3/2018 | Ohnishi | B33Y 10/00 |
| 2018/0134033 A1 | 5/2018 | Sawase | |
| 2018/0147878 A1* | 5/2018 | Asada | B41M 5/0017 |
| 2018/0272739 A1 | 9/2018 | Sawase et al. | |
| 2018/0370253 A1* | 12/2018 | Ohnishi | B41J 3/4078 |
| 2021/0031542 A1 | 2/2021 | Kamihara et al. | |
| 2021/0197584 A1 | 7/2021 | Asada et al. | |
| 2021/0221149 A1 | 7/2021 | Nakamura et al. | |
| 2021/0370692 A1 | 12/2021 | Sawase et al. | |
| 2021/0387463 A1* | 12/2021 | Ohnishi | B41M 7/0045 |
| 2022/0032660 A1* | 2/2022 | Yoda | B41J 29/377 |

FOREIGN PATENT DOCUMENTS

| | | |
|---|---|---|
| JP | 2006-176734 | 7/2006 |
| JP | 2013-180436 | 9/2013 |
| JP | 2021-024181 | 2/2021 |
| JP | 2021-107146 | 7/2021 |

\* cited by examiner

LIQUID DISCHARGE APPARATUS, PRINTER, AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2021-032240, filed on Mar. 2, 2021, in the Japan Patent Office, the entire disclosure of which is hereby incorporated by reference herein.

BACKGROUND

Technical Field

Aspect of this disclosure relates to a liquid discharge apparatus, a printer, and a liquid discharge method.

Related Art

A printer applies a liquid onto a printing object such as a sheet to perform a printing operation. Examples of the printer include a printer using a liquid curable by active energy rays such as ultraviolet rays, a printer heats and dries a liquid applied onto a sheet by ultraviolet irradiation, and the like.

SUMMARY

In an aspect of this disclosure, a liquid discharge apparatus includes a first liquid that generates heat in an absorption wavelength region of an active energy ray, a first discharger configured to discharge the first liquid, a second liquid that starts polymerization in the absorption wavelength region of the active energy ray, a second discharger configured to discharge the second liquid, and an irradiator configured to irradiate the first liquid and the second liquid with the active energy ray.

In another aspect of this disclosure, a printer includes a first liquid that generates heat in an absorption wavelength region of an active energy ray, a first discharger configured to discharge the first liquid, a second liquid that start polymerization in the absorption wavelength region of the active energy ray, a second discharger configured to discharge the second liquid, and an irradiator configured to irradiate the first liquid and the second liquid with the active energy ray.

In still another aspect of this disclosure, a liquid discharging method includes discharging a first liquid that generates heat in an absorption wavelength region of an active energy ray, discharging a second liquid that starts polymerization in the absorption wavelength region of the active energy ray, and irradiating the first liquid and the second liquid with the active energy ray.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
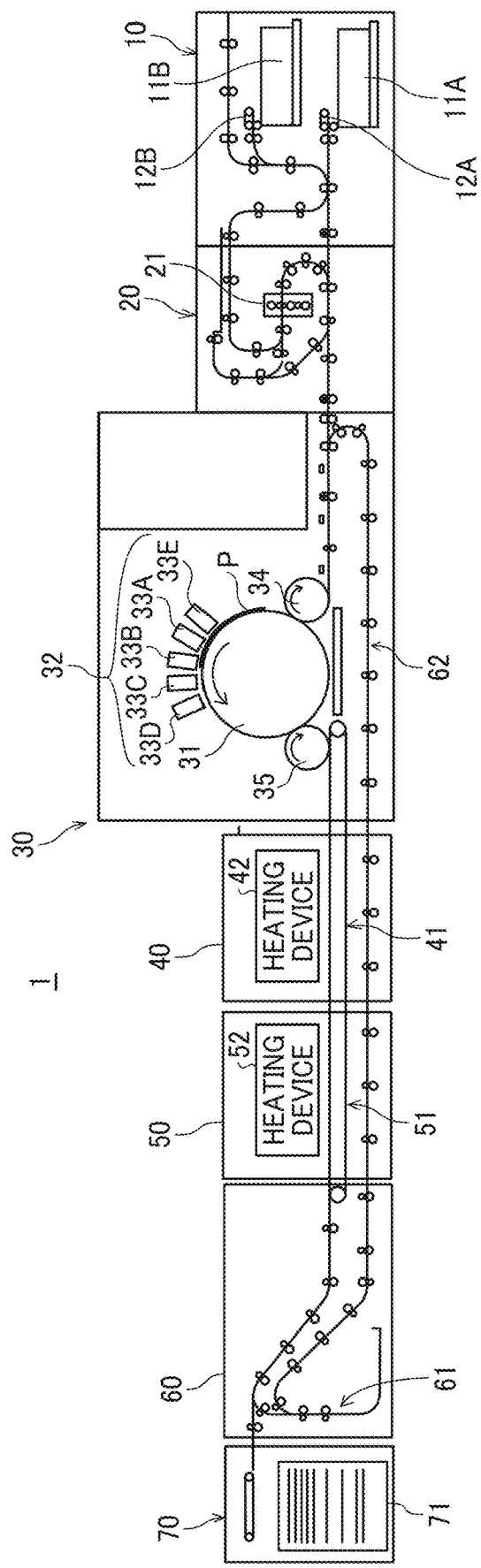
FIG. 1 is a schematic cross-sectional side view of a printer as a liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a" "an", and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Referring now to the drawings, wherein like reference numerals designate identical or corresponding parts throughout the several views, embodiments of the present disclosure are described below. A printer as a liquid discharge apparatus according to a first embodiment of the present disclosure is described with reference to FIGS. 1 and 2.

FIG. 1 is a schematic side view of the printer 1 according to the first embodiment.

Figure 2:
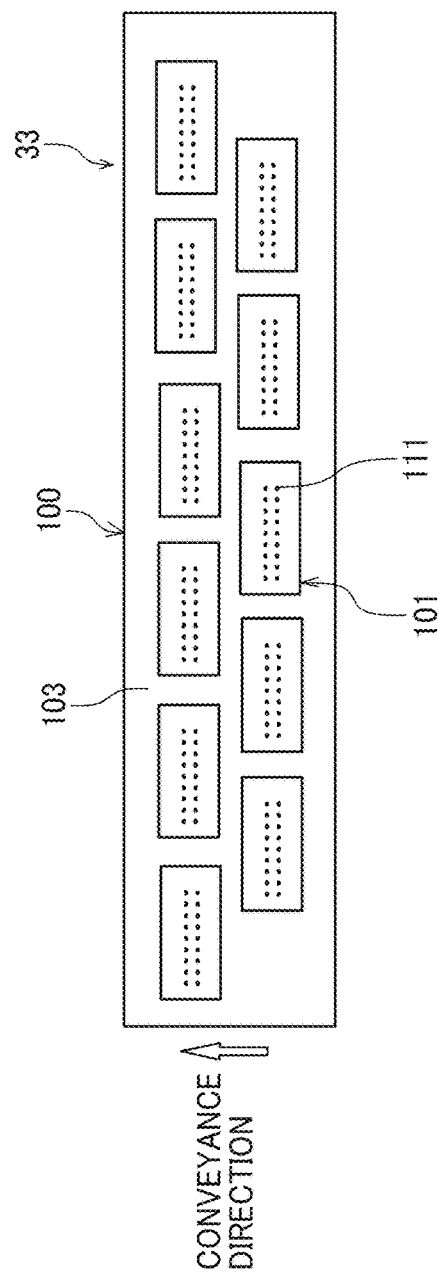
FIG. 2 is a plan view illustrating a discharging unit of the printer of FIG. 1.

FIG. 2 is a schematic plan view of a discharge unit 33 of the printer 1.

The printer 1 according to the first embodiment includes a loading unit 10 to load a sheet P into the printer 1, a pretreatment unit 20, a printing unit 30, a first dryer 4) and a second dryer 50, a reverse mechanism 60, and an ejection unit 70. The pretreatment unit 20 serves as a coater to apply (coat) a pretreatment liquid onto the sheet P.

In the printer 1, the pretreatment unit 20 applies, as desired, a pretreatment liquid as an application liquid onto the sheet P fed (supplied) from the loading unit 10, the printing unit 30 applies a desired liquid onto the sheet P to perform desired printing.

After the printer 1 dries the liquid adhering to the sheet P by the first dryer 40 and the second dryer 50, the printer 1 ejects the sheet P to the ejection unit 70 through the reverse mechanism 60 without printing on a back surface of the sheet P. The printer 1 may print on both sides of the sheet P via the reversing mechanism 60 after the printer 1 dries the liquid adhering to the sheet P by the first dryer 40 and the second dryer 50, and the printer 1 then ejects the sheet P to the ejection unit 70.

The loading unit 10 includes loading trays 11 (a lower loading tray 11A and an upper loading tray 11B) to accommodate multiple sheets P and feeding devices 12 (a feeding device 12A and a feeding device 12B) to separate and feed the multiple sheets P one by one from the loading trays 11, and supplies the sheet P to the pretreatment unit 20.

The pretreatment unit 20 includes, e.g., a coater 21 as a treatment-liquid application unit that coats a printing surface of the sheet P with a treatment liquid having an effect of aggregation of ink particles to prevent bleed-through.

The printing unit 30 includes a drum 31 and a liquid discharge device 32. The drum 31 is a bearer (rotator) that bears the sheet P on a circumferential surface of the drum 31 and rotates. The liquid discharge device 32 discharges liquids toward the sheet P borne on the drum 31.

The printing unit 30 includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the first dryer 40.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position opposite (facing) the drum 31.

Similarly, the drum 31 includes a sheet gripper on a surface of the drum 31, and the leading end of the sheet P is gripped by the sheet gripper of the drum 31. The drum 31 includes multiple suction holes dispersed on a surface of the drum 31. A suction device generates suction airflows directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows generated by the suction device. As the drum 31 rotates, the sheet P is conveyed.

The liquid discharge device 32 includes discharge units 33 (discharge units 33A to 33E) to discharge liquids onto the sheet P as a liquid application unit. For example, the discharge unit 33A discharges a liquid of cyan (C), the discharge unit 33B discharges a liquid of magenta (M), the discharge unit 33C discharges a liquid of yellow (Y), the discharge unit 33D discharges a liquid of black (K), the discharge unit 33E discharges a liquid of white (W). Further, the discharge unit 33 may discharge a special liquid, that is, a liquid of spot color such as gold, silver, and the like.

Thus, the first liquid includes multiple types of colors of inks, and the first discharger (discharge unit 33) includes multiple first dischargers (discharge units 33A to 33D) configured to respectively discharge multiple types of colors of inks such as liquids of cyan (C), magenta (M), yellow (Y), and black (K).

As illustrated in FIG. 2, for example, each of the discharge unit 33 includes a head module 100 including a full-line head. The head module 100 includes multiple liquid discharge heads 101 arranged in a staggered manner on a base 103. Each of the liquid discharge head 101 includes multiple nozzle arrays, and multiple nozzles 111 are arranged in each of the nozzle arrays. Hereinafter, the "liquid discharge head 101" is simply referred to as a "head 101".

A discharge operation of each of the discharge unit 33 of the liquid discharge device 32 is controlled by a drive signal corresponding to print data. When the sheet P borne on the drum 31 passes through a region facing the liquid discharge device 32, the liquids of respective colors are discharged from the discharge units 33 toward the sheet P, and an image corresponding to the print data is formed on the sheet P.

The first dryer 40 includes a heating device 42 such as an infrared (IR) heater. The heating device 42 of the first dryer 40 irradiates the sheet P, onto which the liquid has been applied, with infrared rays to heat and dry the sheet P conveyed by the conveyor 41. The second dryer 50 includes a heating device 52 such as an ultraviolet (UV) ray irradiator to irradiate the liquid on the sheet P with ultraviolet rays as active energy rays, for example. The heating device 52 of the second dryer 5) irradiates the sheet P, to which the liquid has been applied, with infrared rays to heat and dry the sheet P passed through the first dryer 40 and conveyed by a conveyor 51. The conveyor 41 and the conveyor 51 may include a part of same conveyance mechanism.

The reverse mechanism 60 includes a reverse path 61 and a duplex path 62. The reverse path 61 reverses the sheet P that has passed through the first dryer 40 and the second dryer 50 to dry one surface of the sheet P onto which the liquid is applied when the printer 1 performs a duplex printing. The duplex path 62 feeds the reversed sheet P back to upstream (right side in FIG. 1) of the transfer cylinder 34 of the printing unit 30. The reverse path 61 reverses the sheet P by switchback manner.

The ejection unit 70 includes an ejection tray 71 on which the multiple sheets P are stacked. The multiple sheets P conveyed from the reverse mechanism 60 are sequentially stacked and held on the ejection tray 71.

In the present embodiment, an example in which the sheet is a cut sheet is described. However, embodiments of the present disclosure can also be applied to an apparatus using a continuous medium (web) such as continuous paper or roll paper, an apparatus using a sheet material such as wallpaper, and the like.

Here, the liquid discharged from the discharge unit 33 is described below.

The discharge units 33A to 33D are first dischargers that discharge the first liquid 801 (see FIG. 3) that generates heat in an absorption wavelength region of ultraviolet ray as an active energy ray. The first liquid 801 is a water-based pigment ink. That is, the water-based pigment ink is used as ink of each color of C, M. Y, and K (non-white ink).

A typical composition of the water-based pigment ink is about 90% by mass of water and other high boiling point solvents, about 5% by mass of resin, and about 5% by mass of pigment colorant. However, the composition of the water-based pigment ink is not limited to the composition as described above and may be any other compositions. Specifically, as a colorant of the pigment, carbon black may be used for black (K), copper phthalocyanine may be used for cyan (C), quinacridone may be used for magenta (M), and monoazo yellow may be used for yellow (Y), for example. Using such colorants of the pigment, the printer 1 can obtain (print) a vivid printed image that does not fade even when the printed image is irradiated with ultraviolet rays unlike an ink using a colorant of dye.

The discharge unit 33E is a second discharger that discharges the second liquid 802 (see FIG. 3) that starts polymerization in an absorption wave range of ultraviolet rays as active energy rays. The second liquid 802 is an ultraviolet curable ink. In other words, ultraviolet curable ink is used as a white ink (W-ink).

The ultraviolet curable ink contains an ultraviolet polymerization initiator and an ultraviolet polymerization monomer. In the ultraviolet curable ink irradiated with ultraviolet rays, the polymerization initiator becomes an active state of a radical or a cation. The activated polymerization initiator reacts with the monomer so that the monomer is polymerized and cured as a resin. The ultraviolet curable ink is used for the white ink to reduce cockling in a white portion of the printed image.

Next, an example of heating device 52 is described with reference to FIGS. 3 and 4.

Figure 3:
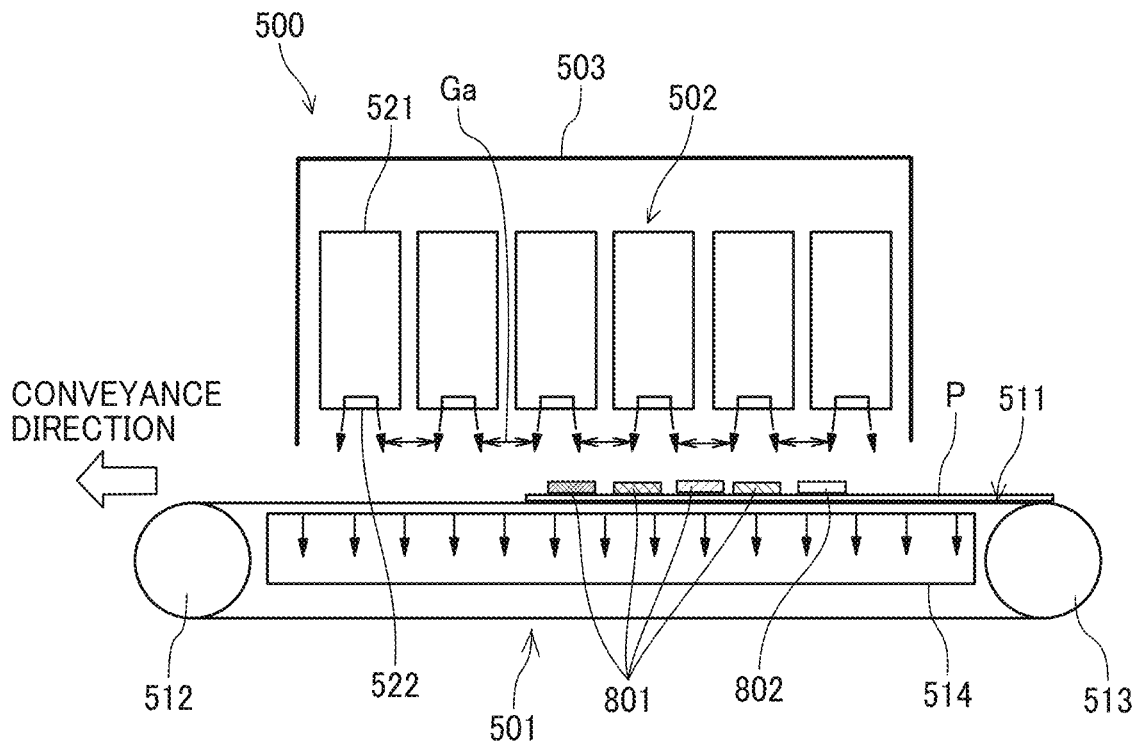
FIG. 3 is a schematic cross-sectional side view of a heating device according to the first embodiment of the present disclosure.

FIG. 3 is a schematic cross-sectional side view of the heating device 500 according to the first embodiment of the present disclosure.

Figure 4:
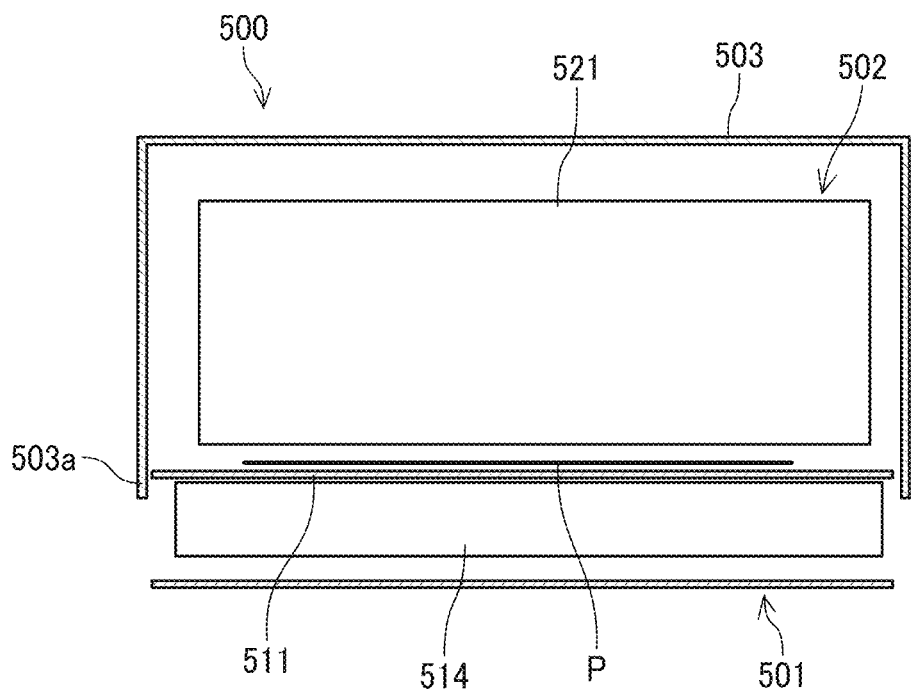
FIG. 4 is a schematic cross-sectional front view of the heating device of FIG. 3.

FIG. 4 is a schematic cross-sectional front view of the heating device 500 according to the first embodiment of the present disclosure.

The heating device 500 of the second dryer 50 includes a conveyance mechanism 501 as a conveyor and an ultraviolet irradiator 502 (see FIG. 4) as the heating device 52. Thus, the second dryer 50 includes the heating device 500.

The conveyance mechanism 501 includes a conveyance belt 511 that bears and conveys the sheet P. The conveyance belt 511 is an endless belt wound (stretched) between a drive roller 512 and a driven roller 513. The conveyance belt 511 circulates (rotates) to move the sheet P. The conveyance mechanism 501 according to the first embodiment includes a mechanism to convey the sheet P from the printing unit 30 to the reverse mechanism 60 as illustrated in FIG. 1.

The conveyance belt 511 is a belt that includes multiple openings from which an air is sucked by a suction chamber 514 disposed inside the conveyance belt 511. The conveyance belt 511 may be, for example, a mesh belt, a flat belt having a suction hole, or the like. The suction chamber 514 includes a suction blower, a fan, or the like to sucks the air through the multiple openings in the conveyance belt 511. The conveyor (first conveyance belt 511) is not limited to the conveyor that uses suction method to attract and convey the sheet P as described above. The conveyor may attract and convey the sheet P on the conveyor by, for example, an electrostatic adsorption method or a gripping method using a gripper.

The ultraviolet irradiator 502 includes multiple (six in FIG. 3) ultraviolet irradiators 521 disposed along a conveyance direction of the sheet P indicated by arrow in FIG. 3 in a housing 503. The ultraviolet irradiators 521 irradiates the sheet P conveyed by the conveyance mechanism 501 with ultraviolet rays to heat the sheet P. The ultraviolet irradiators 521 may be simply referred to as an "irradiator".

As illustrated in FIG. 3, the housing 503 is arranged to have a gap with the conveyance belt 511 in a vertical direction, and the gap is formed along the conveyance direction of the sheet P. As illustrated in FIG. 4, the housing 503 includes an extension portion 503a extended lower than the conveyance belt 511 in a vertical (height) direction perpendicular to the conveyance direction of the sheet P.

Next, an example of the ultraviolet irradiator 521 is described with reference to FIG. 5.

Figure 5:
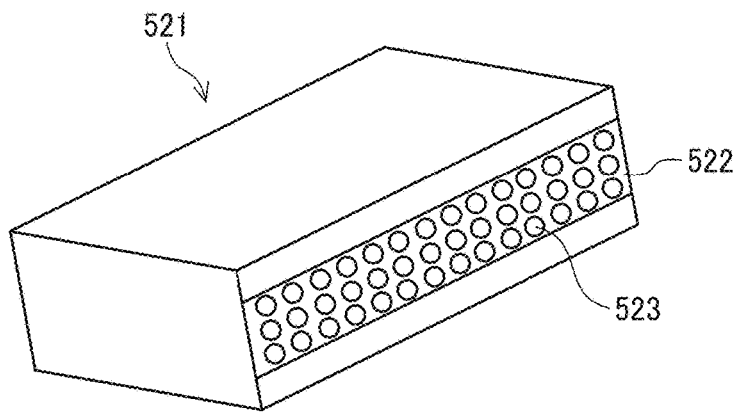
FIG. 5 is a schematic perspective view of an example of an ultraviolet irradiator.

FIG. 5 is a schematic perspective view of an example of the ultraviolet irradiator 521.

The ultraviolet irradiator 521 includes granular ultraviolet light emitting diode elements 523 (UV-LED elements) arranged in a grid pattern on an irradiation surface 522 of the ultraviolet irradiator 521. Since the UV-LED elements 523 emit light at the same illuminance, the ultraviolet irradiator 521 uniformly emits light along the irradiation surface 522 as a whole. As the wavelength of the ultraviolet light, a wavelength having a peak wavelength of 395 nm and a wavelength distribution having a full width at half maximum of about 15 nm was used.

Thus, the ultraviolet irradiator 521 includes a light emitting diode (UV-LED elements 523) configured to emit an ultraviolet ray. The ultraviolet irradiator 521 irradiates the first liquid and the second liquid with the active energy (ultraviolet ray). Thus, the irradiating operation of the, the ultraviolet irradiator 521 emits an ultraviolet ray.

As illustrated in FIG. 3, the irradiation surfaces 522 of the ultraviolet irradiators 521 are arranged at predetermined intervals Ga in the conveyance direction of the sheet P.

Next, an effect of the printer 1 (liquid discharge apparatus) according to the first embodiment is described with reference also to FIG. 6.

Figure 6:
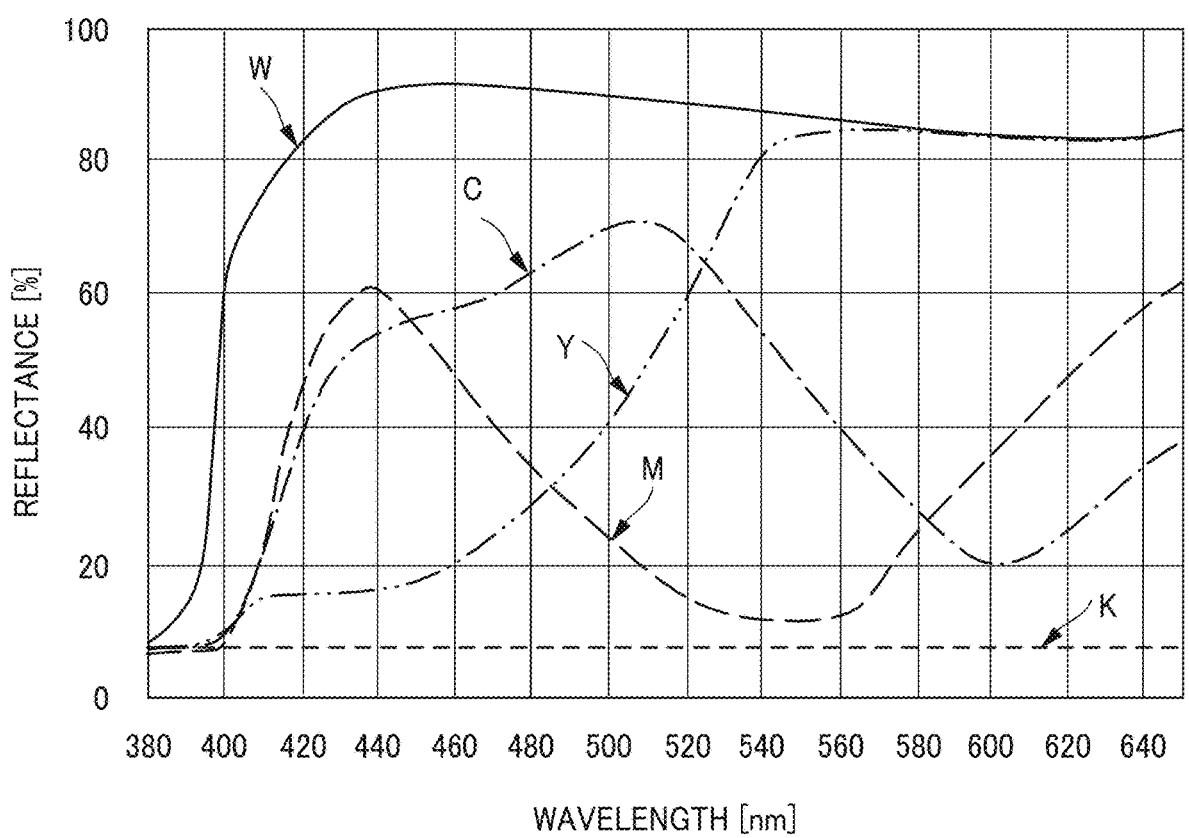
FIG. 6 is a graph illustrating an example of a reflectance with respect to the wavelength of ultraviolet rays of each color used for explaining an effect of the printer according to the first embodiment.

FIG. 6 is a graph illustrating an example of the reflectance with respect to the wavelength of the ultraviolet rays of each color used for explaining the effect of the printer (liquid discharge apparatus).

Pigment inks of process colors of black (K), cyan (C), magenta (M), and yellow (Y) as illustrated in FIG. 6 and special color pigment inks such as oranges, greens, and violets have absorption wavelengths in an ultraviolet wavelength range (380 to 400 nm) and generate heat. The absorption wavelengths in the ultraviolet wavelength range (380 to 400 nm) is also referred to as an "ultraviolet absorption wavelength range".

The ultraviolet irradiator 521 irradiates the water-based pigment ink (first liquid 801) applied to the sheet P with ultraviolet rays having wavelengths of 380 to 400 nm so that the ultraviolet rays acts on an absorption wavelength region of a coloring material or compositions in the water-based pigment ink to generate heat and dry the water-based pigment ink (first liquid 801).

On the other hand, when the water-based pigment ink is used for a white (W) ink as illustrated in FIG. 6, an absorption of the ultraviolet rays of the coloring material or compositions in the water-based pigment ink is lower than the absorption of the inks of other process colors (K, C, M, Y) in the water-based pigment ink in the ultraviolet absorption wavelength region (380 to 400 nm) so that the white ink (W) does not easily generate heat and does not dry easily.

In other words, the white ink (W) has higher reflectance than the inks of other process colors (K, C, M, Y) in the water-based pigment ink in the ultraviolet absorption wavelength range (380 to 400 nm) of the ultraviolet rays. Further, the white ink is mainly used as a white portion of an image on a medium (sheet P) that is not white.

That is, the white ink of the water-based pigment base absorbs less ultraviolet rays and does not generate heat so that the white ink is less likely to be dried. Thus, the white ink may cause problems such as a conveyance path is stained, or an image is peeled off when the sheets P, which are stacked after ejection from the printer 1 is separated from other sheets P since the sheets P are adhered and fixed with each other by the white ink.

Therefore, the printer 1 according to the first embodiment uses an ultraviolet curable ink (second liquid 802) for the white ink. When the ultraviolet curable ink is used for the white ink, the ultraviolet irradiator 521 irradiates the white ink with the ultraviolet rays in the ultraviolet absorption wavelength range (380 to 400 nm) so that the monomer in the white ink is polymerized, and the white ink can be cured and dried.

As a result, the printer 1 can produce an image in which cockling does not occur in the white portion and can prevent stains inside the conveyance path by undried ink even when the white ink is used in a printing process in the printer 1.

The printer 1 according to the first embodiment limits a usage of the active energy curable ink having a relatively large environmental load to the white ink to perform efficient drying process while reducing the environmental load. Thus, the printer 1 according to the first embodiment of the present disclosure can efficiently dry a sheet while reducing an environmental load.

Since the ultraviolet irradiator 521 used for a drying process can act on both of the water-based pigment inks (black, cyan, magenta, yellow, orange, green, and violet) and the white ink by one-type of unit so that the printer 1 (liquid discharge apparatus) can reduce a size and a cost of the printer 1.

Here, liquid compositions used as the first liquid and the second liquid is described below.

The liquid composition used in the first embodiment contains water or an organic solvent, and optionally contains other components such as a coloring material and a resin. The liquid composition curable by active energy used in the present embodiment may contain an ultraviolet polymerization initiator and an ultraviolet polymerizable compound.

When a colorant such as a pigment or a dye is contained in the liquid composition, the colorant absorbs light irradiated by the irradiator, converts the light into thermal energy, and generates heat. When a temperature of the liquid composition rises, water and the organic solvent evaporate. When the liquid composition contains a resin, the resin melts so that a printed image is fixed onto the sheet P.

Ultraviolet Polymerization Initiator and Ultraviolet Polymerizable Compound When the liquid composition contains the ultraviolet polymerization initiator and the ultraviolet polymerizable compound, the content of the ultraviolet polymerization initiator in the liquid composition is less than 0.1% by mass, or the content of the ultraviolet polymerizable compound in the liquid composition is less than 5% by mass.

Examples of the ultraviolet polymerization initiator include the ultraviolet polymerization initiator capable of generating an active species such as a radical or a cation by ultraviolet rays (UV rays) and initiating polymerization of a polymerizable compound (monomer or oligomer). As such the ultraviolet polymerization initiator, a known radical polymerization initiator, a known cationic polymerization initiator, a known base generator, or the like may be used alone or in combination of two or more.

Specific examples of the radical polymerization initiators include, but are not limited to, aromatic ketones, acylphosphine oxide compounds, aromatic onium salt compounds, organic peroxides, thio compounds (e.g., thioxanthone compounds and thiophenyl-group-containing compounds), hexaaryl biimidazole compounds, ketoxime ester compounds, borate compounds, azinium compounds, metallocene compounds, active ester compounds, carbon-halogen-bond-containing compounds, and alkylamine compounds.

The ultraviolet polymerizable compound is not particularly limited and can be appropriately changed. For example, a known polymerizable compound can be used. The polymerizable compound may be a monomer or an oligomer. Examples of the ultraviolet polymerizable compound include methacrylic acid.

Water The content of water in the liquid composition is not particularly limited and may be appropriately selected depending on an intended purpose. The content of water is preferably 10% by mass or more and 90% by mass or less, more preferably 20% by mass or more and 60% by mass or less, from the viewpoint of drying properties and discharge reliability.

Organic Solvent The organic solvent used in the present disclosure is not particularly limited, and a water-soluble organic solvent can be used. Examples of water-soluble organic solvents include polyols, ethers (e.g., polyol alkyl ethers and polyol aryl ethers), nitrogen-containing heterocyclic compounds, amides, amines, and sulfur-containing compounds.

Specific examples of the polyols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyol aryl ethers include, but are not limited to, ethylene glycol monophenyl ether and ethylene glycol monobenzyl ether.

Examples of nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amides include, but are not limited to, formamide. N-methylformamide, N, N-dimethylformamide, 3-methoxy-N, N-dimethylpropionamide, and 3-butoxy-N, N-dimethylpropionamide.

Examples of amines include, but are not limited to, monoethanolamine, diethanolamine, and triethylamine.

Examples of sulfur-containing compounds include, but are not limited to, dimethyl sulfoxide, sulfolane, and thiodiethanol.

Examples of other organic solvents include, but are not limited to, propylene carbonate and ethylene carbonate.

In particular, organic solvents having a boiling point of 250° C. or less are preferred, since they not only function as a wetting agent but also provide good drying property.

Preferred examples of the organic solvent further include polyol compounds having 8 or more carbon atoms and glycol ether compounds. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

The polyol compounds having 8 or more carbon atoms and the glycol ether compounds are capable of improving paper-permeability of the ink, which is advantageous when paper is used as a recording medium.

The content of the organic solvent in the liquid composition is not particularly limited and may be appropriately selected depending on the intended purpose, but is preferably 10% by mass or more and 60% by mass or less, more preferably 20% by mass or more and 60% by mass or less, from the viewpoint of drying properties and discharge reliability.

Content of Water and Organic Solvent The total amount of water and organic solvent in the liquid composition is preferably 80% by mass or more, and more preferably 90% by mass or more. The liquid composition having the above content of water and organic solvent can improve the discharge performance.

Colorant The colorant is not particularly limited, and pigments and dyes can be used as the colorant.

Usable pigments include both inorganic pigments and organic pigments. Each of the pigments may be used alone or two or more of the pigments may be used in combination. Mixed crystals may also be used as the colorant.

Usable pigments include, but are not limited to, black pigments, yellow pigments, magenta pigments, cyan pigments, white pigments, green pigments, orange pigments, glossy color pigments (e.g., gold pigments and silver pigments), and metallic pigments.

Specific examples of inorganic pigments include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, the pigments having good affinity for solvents are preferable. In addition, hollow resin particles and hollow inorganic particles can also be used.

Specific examples of pigments for black include, but are not limited to carbon blacks (i.e., C.I. Pigment Black 7) such as furnace black, lamp black, acetylene black, and channel black; metals such as copper, iron (i.e., CI. Pigment Black 11), and titanium oxide; and organic pigments such as aniline black (i.e., C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 170, 172, 177, 178, 179, 184, 185, 190, 193, 202, 207, 208, 209, 213, 219, 224, 254, and 264; CI. Pigment Violet 1 (Rhodamine Lake), 3, 5:1, 16, 19, 23, and 38; CI. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dyes are not particularly limited, and acid dyes, direct dyes, reactive dyes, and basic dyes can be used. Each of these can be used alone or in combination with others.

Specific examples of the dyes include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the colorant in the liquid composition is preferably 0.1% by mass or more and 15% by mass or less, more preferably 1% by mass or more and 10% by mass or less, for improving image density, fixability, and discharge stability.

Examples of the method of dispersing the pigment in the liquid composition include, but are not limited to, a method of introducing a hydrophilic functional group to the pigment to make the pigment self-dispersible, a method of covering the surface of the pigment with a resin to disperse the pigment; and a method of dispersing the pigment by a dispersant.

In the method of introducing a hydrophilic functional group to the pigment to make the pigment self-dispersible, for example, a functional group such as sulfonic acid group and carboxyl group may be introduced to the pigment (e.g., carbon) to make the pigment dispersible in water.

Examples of the method for coating a surface of the pigment with a resin to disperse the pigment include a method for making a pigment encapsulated in a microcapsule such that the pigment can be dispersed in water. In this case, the pigment may be referred to as a resin-coated pigment. In this case, not all the pigment particles included in the ink should be covered with a resin. It is possible that a part of the pigment particles is not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

As a dispersant, RT-100 (nonionic surfactant) manufactured by Takemoto Yushi Co., Ltd. and naphthalenesulfonic acid Na formalin condensate can also be suitably used as the dispersant.

Each of the above dispersants may be used alone or in combination with others.

A liquid composition such as an ink can be obtained by mixing a pigment with a material such as water or an organic solvent. The liquid composition can also be obtained by, first, preparing a pigment dispersion by mixing a pigment with water, a dispersant, etc., and thereafter mixing the pigment dispersion with other materials such as water and an organic solvent.

The pigment dispersion is obtained by mixing and dispersing water, a pigment, a pigment dispersant, and other components as desired, and adjusting the particle size.

The particle diameter of the pigment dispersed in the pigment dispersion is not particularly limited. Preferably, the pigment dispersed in the pigment dispersion has a maximum frequency particle diameter in the range of from 20 to 500 nm, more preferably from 20 to 150 nm, based on the number of pigment particles, from the aspects of dispersion stability of the pigment and discharge stability and image quality (e.g., image density) of the ink. The particle diameter of the pigment can be measured with a particle size analyzer (NANOTRAC WAVE-UT151 manufactured by Microtrac-BEL Corp.).

The proportion of the pigment in the pigment dispersion is not particularly limited and can be suitably selected to suit to a particular application, but is preferably 0.1% by mass or more and 50% by mass or less, more preferably 0.1% by mass or more and 30% by mass or less, for improving discharge stability and enhancing image density.

Preferably, the pigment dispersion is subjected to filtration using a filter or a centrifugal separator to remove coarse particles, followed by degassing.

Resin The type of the resin contained in the liquid composition is not particularly limited and can be suitably selected to suit to a particular application. Specific examples of the resin contained in the liquid composition include urethane resins, polyester resins, acrylic resins, vinyl acetate resins, styrene resins, butadiene resins, styrene-butadiene resins, vinyl chloride resins, acrylic styrene resins, and acrylic silicone resins.

Resin particles made of these resins may also be used. The resin particles may be dispersed in water as a dispersion medium to prepare a resin emulsion. The liquid composition can be obtained by mixing the resin emulsion with other materials such as a colorant and an organic solvent. The resin particles may be suitably synthesized or a commercial product. The resin particles may include one type or two or more types of resin particles.

The volume average particle diameter of the resin particles is not particularly limited and can be suitably selected to suit to a particular application, but is preferably from 10 nm or more and 1,000 nm or less, more preferably 10 nm or more and 200 nm or less, and particularly preferably 10 nm or more and 100 nm or less, for good fixability and high image hardness.

The volume average particle diameter can be measured using a particle size analyzer (NANOTRAC WAVE-UT151, product of MicrotracBEL Corp.).

The proportion of the resin in the liquid composition is not particularly limited and can be suitably selected to suit to a particular application, but is preferably 1% by mass ore more and 30% by mass or less, more preferably 5% by mass or more and 20% by mass or less, for fixability and storage stability of the liquid composition.

Other Components

The liquid composition may further contain a surfactant, a defoamer, a preservative, a fungicide, a corrosion inhibitor, and/or a pH adjuster.

The liquid discharge apparatus according to the present disclosure can efficiently dry a sheet while reducing an environmental load.

In the present embodiments, a "liquid" discharged from the head is not particularly limited as long as the liquid has a viscosity and surface tension of degrees dischargeable from the head. Preferably, the viscosity of the liquid is not greater than 30 mPa·s under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light emitting element or a resist pattern of electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid on materials to which liquid can adhere, but also apparatuses to discharge a liquid toward gas or into a liquid.

The "liquid discharge apparatus" may include units to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid adheres unless particularly limited.

Examples of the "material on which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:
a first liquid that generates heat in an absorption wavelength region of an active energy ray;
a first discharger to discharge the first liquid;
a second liquid that starts polymerization in the absorption wavelength region of the active energy ray;
a second discharger to discharge the second liquid; and
an irradiator to irradiate the first liquid and the second liquid with the active energy ray,
wherein another irradiator irradiates the first liquid and the second liquid with an infrared ray before the irradiator irradiates the first liquid and the second liquid with the active energy ray,
the first liquid includes a pigment as a colorant,
the second liquid is a white ink including a photopolymerization initiator in a content of less than 0.1% by mass,
the first liquid is a non-white ink,
the first liquid includes multiple types of colors of inks,
the first discharger comprises multiple first dischargers configured to respectively discharge the multiple types of colors of inks, and
the first liquid is discharged for printing after the second liquid is discharged for printing.

2. The liquid discharge apparatus according to claim 1, wherein the active energy ray is an ultraviolet ray.

3. The liquid discharge apparatus according to claim 1, wherein the first liquid is a water-based pigment ink.

4. The liquid discharge apparatus according to claim 1, wherein the second liquid is an ultraviolet curable ink.

5. The liquid discharge apparatus according to claim 1, wherein the irradiator includes a light emitting diode configured to emit an ultraviolet ray.

6. A printer comprising:
a first liquid that generates heat in an absorption wavelength region of an active energy ray;
a first discharger configured to discharge the first liquid;
a second liquid that starts polymerization in the absorption wavelength region of the active energy ray;
a second discharger configured to discharge the second liquid; and
an irradiator configured to irradiate the first liquid and the second liquid with the active energy ray,
wherein another irradiator irradiates the first liquid and the second liquid with an infrared ray before the irradiator irradiates the first liquid and the second liquid with the active energy ray,
the first liquid includes a pigment as a colorant,
the second liquid is a white ink including a photopolymerization initiator in a content of less than 0.1% by mass,
the first liquid is a non-white ink,
the first liquid includes multiple types of colors of inks,
the first discharger comprises multiple first dischargers configured to respectively discharge the multiple types of colors of inks, and
the first liquid is discharged for printing after the second liquid is discharged for printing.

7. A liquid discharging method comprising:
discharging a first liquid that generates heat in an absorption wavelength region of an active energy ray;
discharging a second liquid that starts polymerization in the absorption wavelength region of the active energy ray;
irradiating the first liquid and the second liquid with an infrared ray; and
irradiating the first liquid and the second liquid with the active energy ray,
wherein the first liquid includes a pigment as a colorant,
the second liquid is a white ink including a photopolymerization initiator in a content of less than 0.1% by mass,
the first liquid is a non-white ink,
the first liquid includes multiple types of colors of inks,
the discharging the first liquid respectively discharging the multiple types of colors of inks, and
the first liquid is discharged for printing after the second liquid is discharged for printing.

8. The liquid discharge method according to claim 7, wherein the active energy ray is an ultraviolet ray.

9. The liquid discharge method according to claim 7, wherein the first liquid is a water-based pigment ink.

10. The liquid discharge method according to claim 7, wherein the second liquid is an ultraviolet curable ink.

11. The liquid discharge method according to claim 7, wherein the irradiating includes emitting an ultraviolet ray to the first liquid and the second liquid.

* * * * *